(12) United States Patent
Strauss

(10) Patent No.: US 9,566,995 B2
(45) Date of Patent: Feb. 14, 2017

(54) ZERO PLAY HINGE FOR A STROLLER

(71) Applicant: BRITAX CHILD SAFETY, INC., Fort Mill, SC (US)

(72) Inventor: Ralf Strauss, Stanley, NC (US)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 0 days.

(21) Appl. No.: 14/834,504

(22) Filed: Aug. 25, 2015

(65) Prior Publication Data

US 2016/0059876 A1 Mar. 3, 2016

Related U.S. Application Data

(60) Provisional application No. 62/043,494, filed on Aug. 29, 2014.

(51) Int. Cl.
*B62B 9/12* (2006.01)
*B62B 7/06* (2006.01)
(Continued)

(52) U.S. Cl.
CPC . *B62B 9/12* (2013.01); *B62B 7/06* (2013.01); *B62B 7/062* (2013.01); *E05D 11/105* (2013.01);
(Continued)

(58) Field of Classification Search
CPC .............. B62B 9/10; B62B 9/12; B62B 9/20; B62B 7/06; B62B 7/062; E05D 11/10; E05D 11/1028; E05D 11/105; E05D 11/1078; E05D 11/1092; E05D 2011/1092; F16C 11/00; F16C 11/04; F16C 11/10; F16C 11/103
(Continued)

(56) References Cited

U.S. PATENT DOCUMENTS 5,039,118 A * 8/1991 Huang ...................... B62B 9/20
280/47.371
5,765,958 A * 6/1998 Lan .......................... B62B 7/06
403/84
(Continued)

FOREIGN PATENT DOCUMENTS

DE 29706026 U1 5/1997
GB 2379955 A 3/2002
(Continued)

OTHER PUBLICATIONS

Search Report and Written Opinion from corresponding European application No. 15002539.3 mailed Mar. 18, 2016, all enclosed pages cited.
(Continued)

*Primary Examiner* — John Walters
(74) *Attorney, Agent, or Firm* — Nelson Mullins Riley & Scarborough LLP

(57) ABSTRACT

A hinge for pivotally joining a first frame member and a second frame member of a frame of a stroller may include a first housing portion, a second housing portion, a release actuator and a locking member. The first housing portion may be operably coupled to the first frame member. The second housing portion may be operably coupled to the second frame member. The release actuator may be configured to operate to enable the hinge to shift between a locked state and an unlocked state. The locking member may be configured to move in an axial direction responsive to shifting between the locked state and the unlocked state. The external periphery of the locking member may include a first incline surface that engages both the first housing portion and the second housing portion in the locked state.

18 Claims, 11 Drawing Sheets

Figure 1:
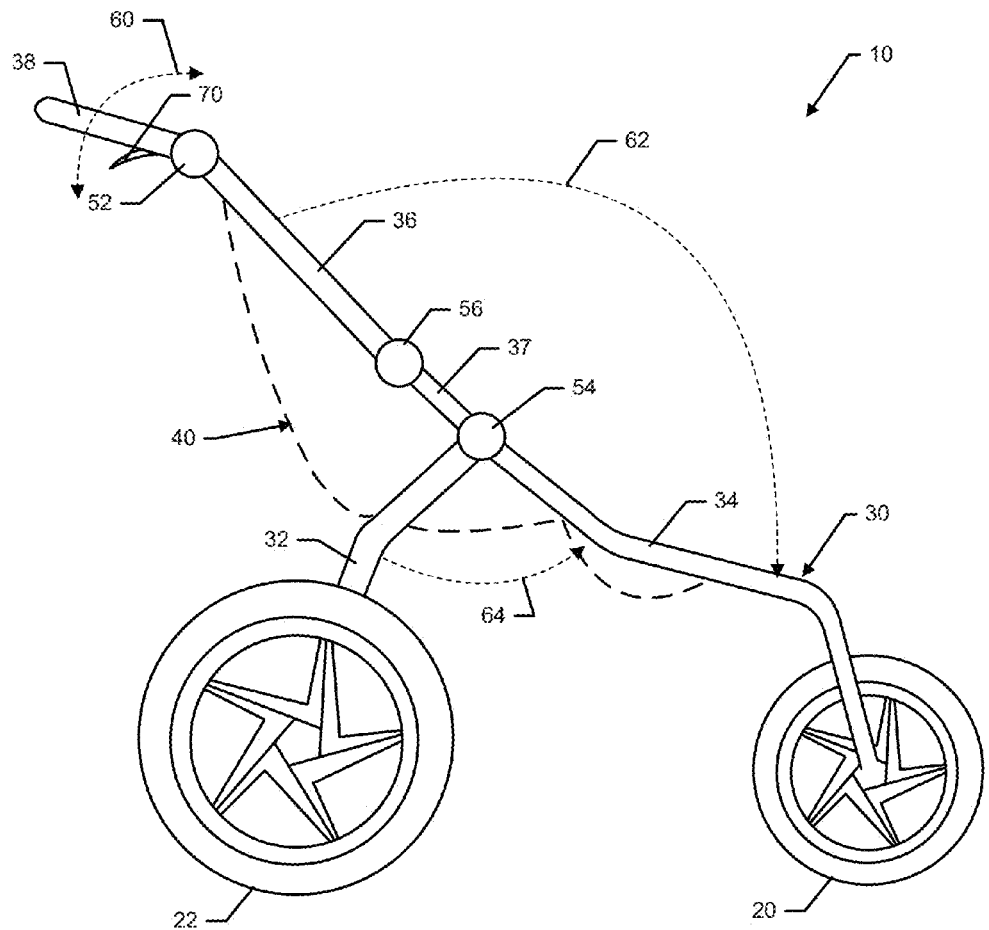

(51) Int. Cl.
*E05D 11/10* (2006.01)
*F16C 11/00* (2006.01)
*B62B 9/20* (2006.01)

(52) U.S. Cl.
CPC ................. *F16C 11/00* (2013.01); *B62B 9/20* (2013.01); *E05D 2011/1092* (2013.01)

(58) Field of Classification Search
USPC ................................. 280/647, 650, 657, 658
See application file for complete search history.

(56) References Cited

U.S. PATENT DOCUMENTS

| | | | |
|---|---|---|---|
| 7,617,569 B2 * | 11/2009 | Liao ........................ | B62B 3/12 16/297 |
| 8,602,442 B2 * | 12/2013 | Li .......................... | B62B 7/062 280/642 |
| 9,310,021 B2 * | 4/2016 | Hennessey ............ | F16M 11/10 |

FOREIGN PATENT DOCUMENTS

| | | |
|---|---|---|
| RU | 2501698 C2 | 12/2013 |
| WO | 2004052710 A1 | 6/2004 |
| WO | 2008031099 A1 | 3/2008 |

OTHER PUBLICATIONS

Search Report from corresponding Russian application No. 2015135097 mailed Nov. 14, 2016, all enclosed pages cited.
Office Action from corresponding Russian application No. 2015135097 mailed Nov. 14, 2016, all enclosed pages cited.

\* cited by examiner

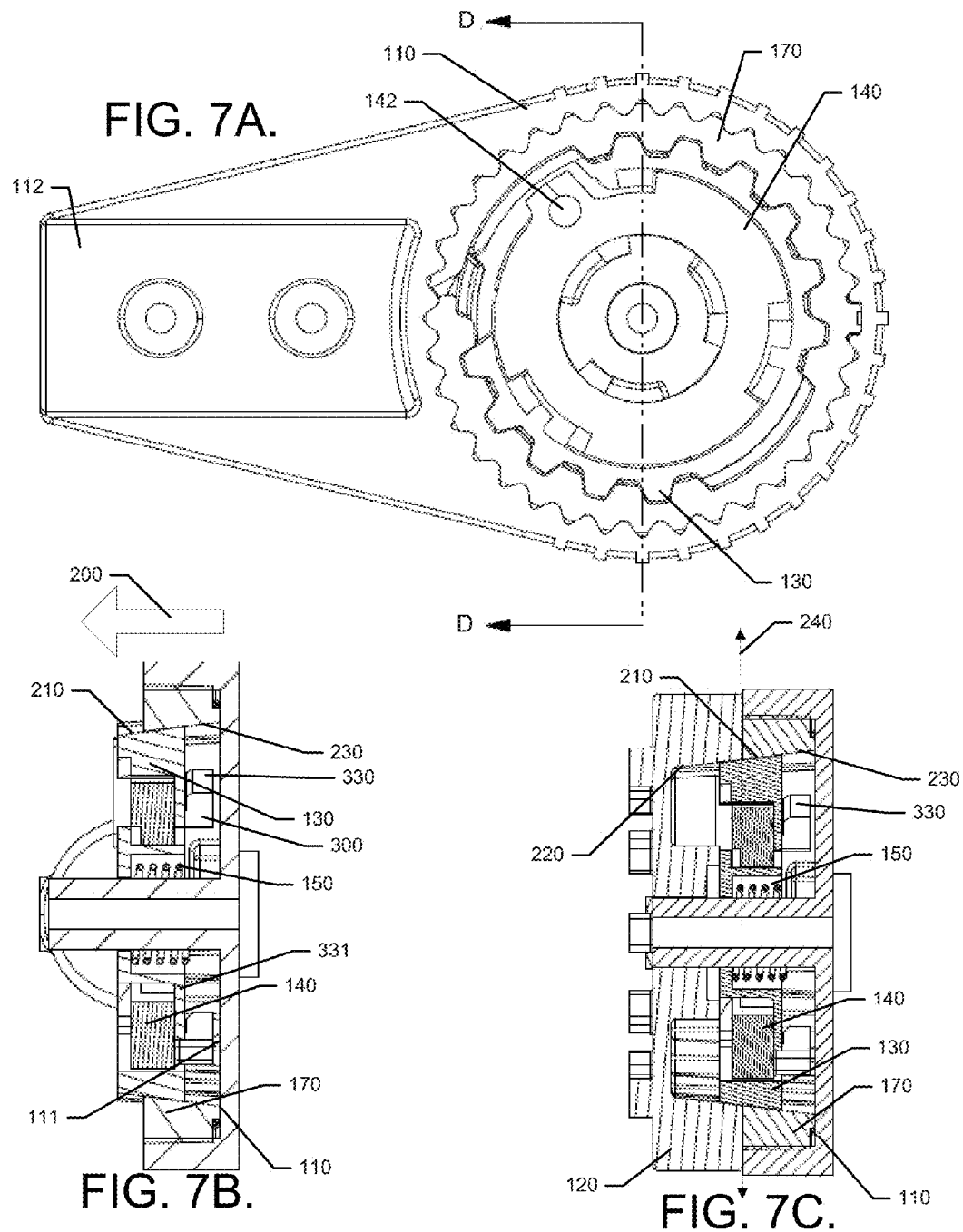

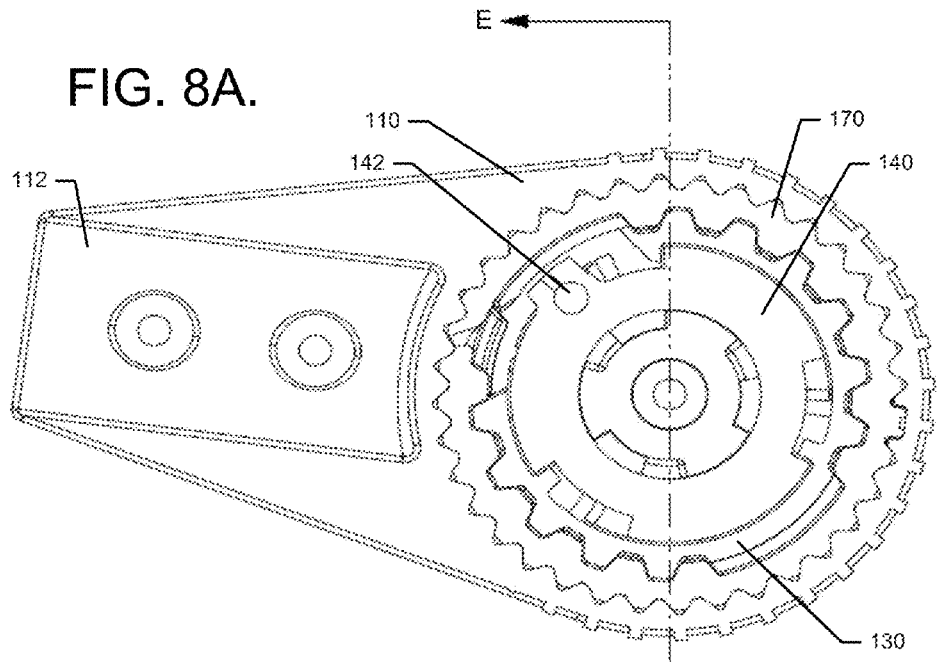
FIG. 8A.
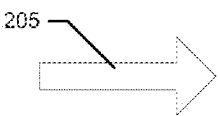
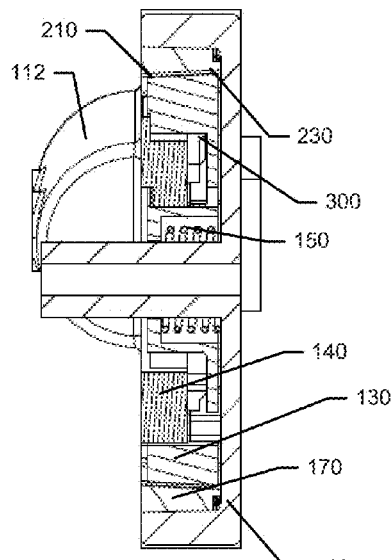
FIG. 8B.
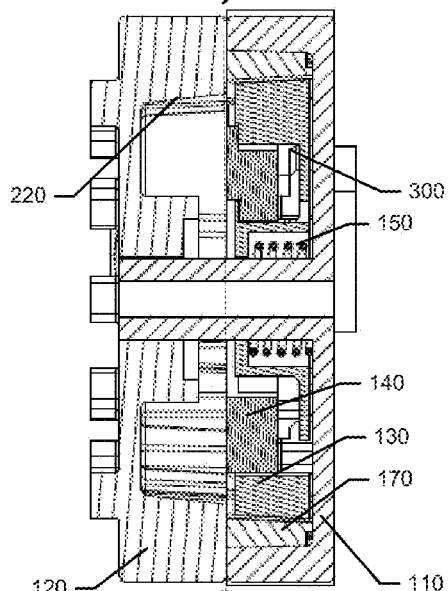
FIG. 8C.

ZERO PLAY HINGE FOR A STROLLER

CROSS-REFERENCE TO RELATED APPLICATIONS

This application claims the benefit of U.S. Provisional Application No. 62/043,494 filed on Aug. 29, 2014, the entire contents of each which are hereby incorporated herein by reference.

TECHNICAL FIELD

Exemplary embodiments of the present disclosure generally relate to a folding stroller, and more particularly, to a folding stroller having one or more hinges that allow the stroller to be folded when not in use.

BACKGROUND

In general, strollers are wheeled devices used to transport a passenger, typically a child. Some strollers may be configured to fold or collapse when not in use in order to occupy less space for transport or storage. To facilitate the folding or collapsing of the stroller, one or more hinges may be provided at different locations along the frame of the stroller. These hinges may form pivot points about which the frame components may rotate, pivot, swing or articulate in order to achieve the folding or collapsing of the stroller.

The hinges typically have a locked state in which at least two frame members are held rigidly in a particular orientation relative to one another and an unlocked state in which at least one of the frame members can rotate relative to another frame member. Although the hinges are generally designed to allow the stroller to fold easily while also being able to maintain the stroller in a rigid operational position to receive a passenger, it is common for these hinges to have at least some "play" associated therewith even in the locked state. The play that these hinges have is a function of the fact that the hinges are typically designed with some small gaps between components that provide the locking function in order to make the operation of the hinge relatively easy. If these gaps are not employed, it may be difficult to get the hinge components to properly seat to transition to the locked state.

Although easy operation of the hinge is certainly an important design consideration, the play associated with the hinges can create a feeling of instability of the stroller, which may trouble consumers. A tighter fitting hinge in the locked state may therefore greatly increase a consumer's satisfaction with the stroller and perception of quality. Accordingly, embodiments of the present invention described herein relate to an improved hinge for a stroller and strollers having one or more such hinges.

BRIEF SUMMARY OF SOME EXAMPLES

Some example embodiments may enable the provision of a stroller hinge capable of being easily operable between locked and unlocked states. However, some example embodiments may further enable the provision of a stroller hinge that provides very little (e.g., zero or near zero) play when the hinge is in the locked state.

In one example embodiment, a hinge for a stroller is provided. The hinge may pivotally join a first frame member and a second frame member of a frame of the stroller. The hinge may include a first housing portion, a second housing portion, a release actuator and a locking member. The first housing portion may be operably coupled to the first frame member. The second housing portion may be operably coupled to the second frame member. The release actuator may be configured to operate to enable the hinge to shift between a locked state and an unlocked state. The locking member may be configured to move in an axial direction responsive to shifting between the locked state and the unlocked state. The external periphery of the locking member may include a first incline surface that engages both the first housing portion and the second housing portion in the locked state.

In another example embodiment, a stroller is provided. The stroller may include a seat for supporting a passenger, a frame including at least a first frame member and a second frame member to support the seat, and a hinge configured to pivotally engage the first and second frame members to each other. The hinge may include a first housing portion, a second housing portion, a release actuator and a locking member. The first housing portion may be operably coupled to the first frame member. The second housing portion may be operably coupled to the second frame member. The release actuator may be configured to operate to enable the hinge to shift between a locked state and an unlocked state. The locking member may be configured to move in an axial direction responsive to shifting between the locked state and the unlocked state. The external periphery of the locking member may include a first incline surface that engages both the first housing portion and the second housing portion in the locked state.

BRIEF DESCRIPTION OF THE SEVERAL VIEWS OF THE DRAWING(S)

Figure 2A:
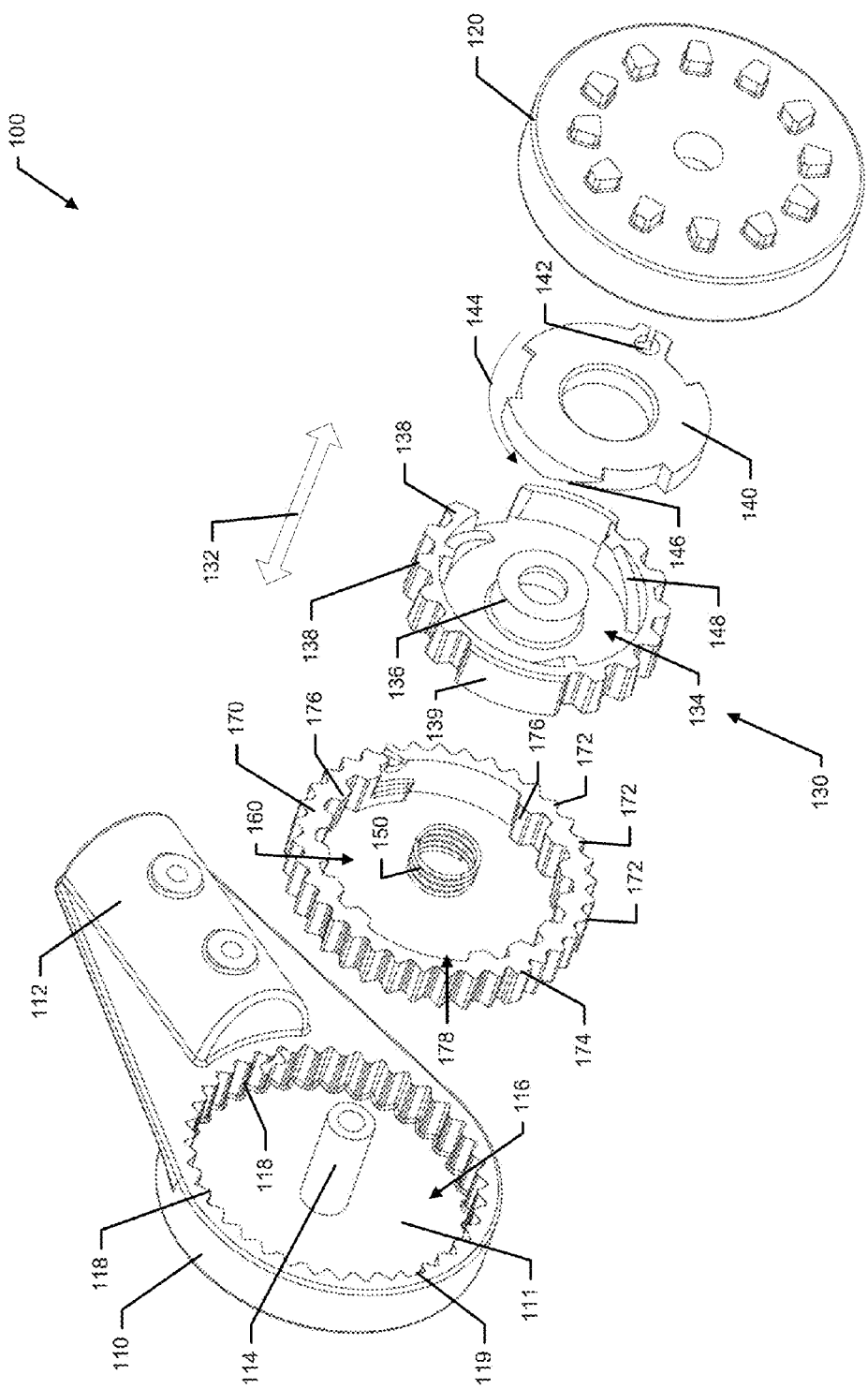
Figure 2B:
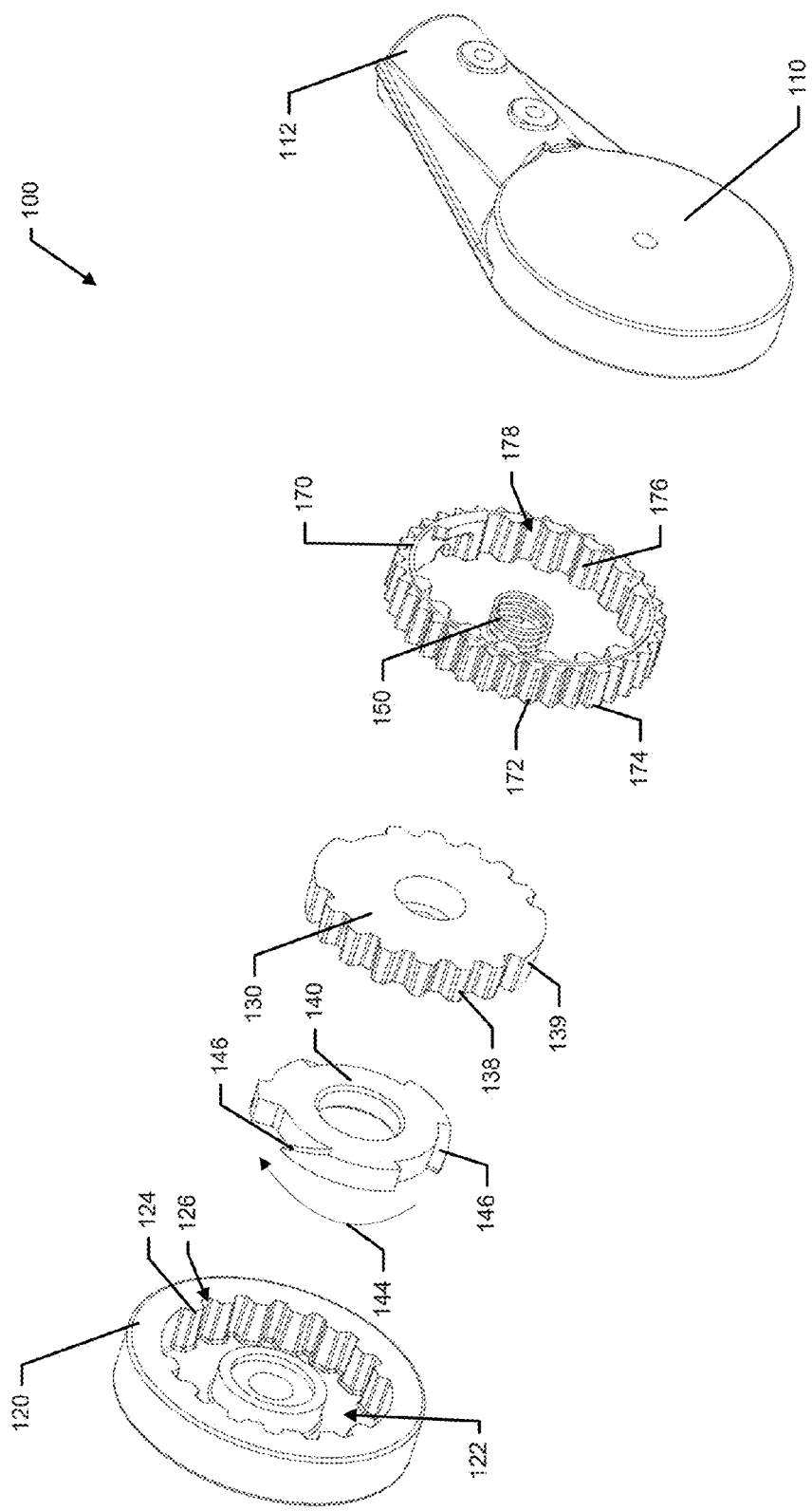
Figure 3A:
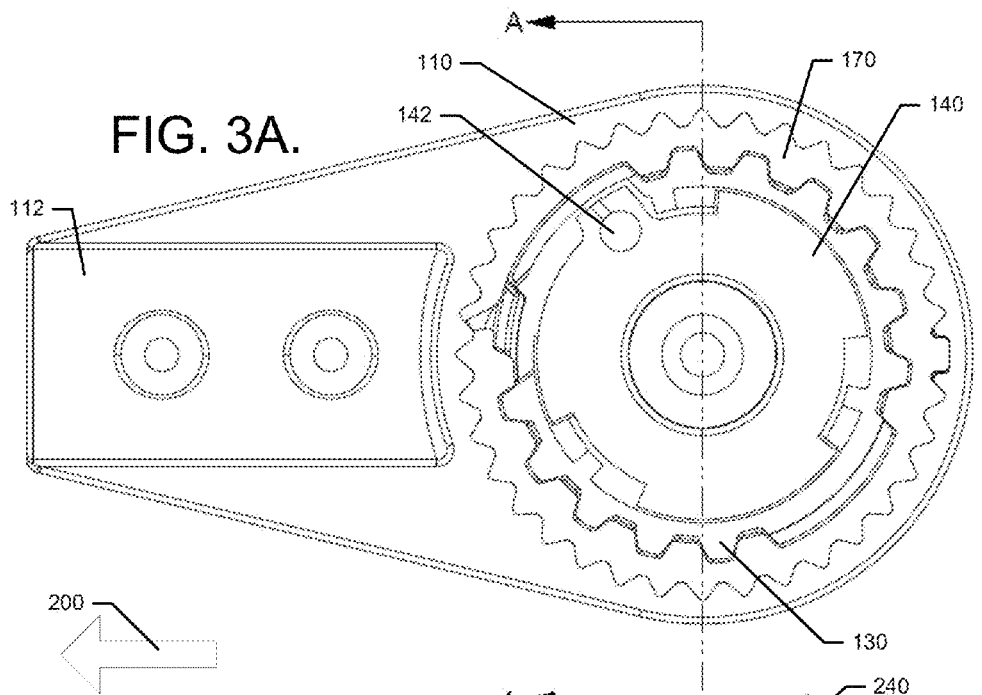
Figure 3B:
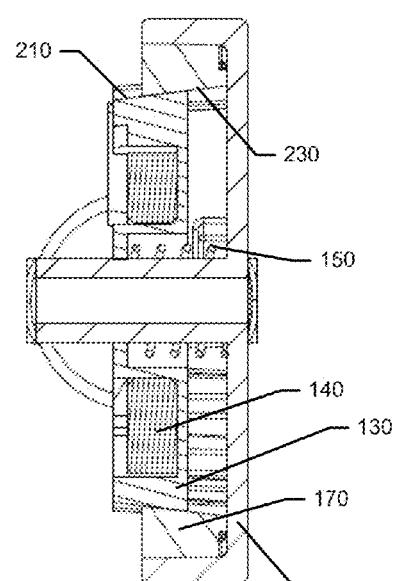
Figure 3C:
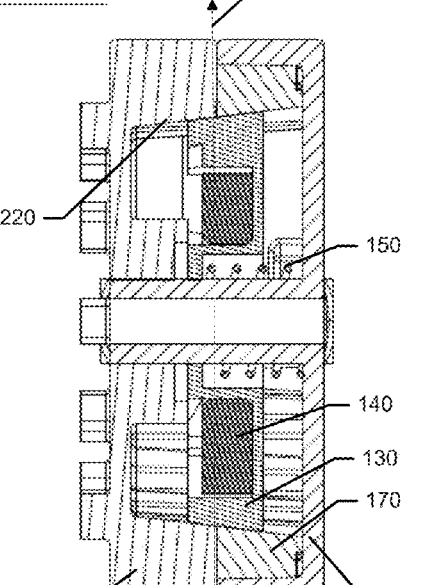
Figure 4A:
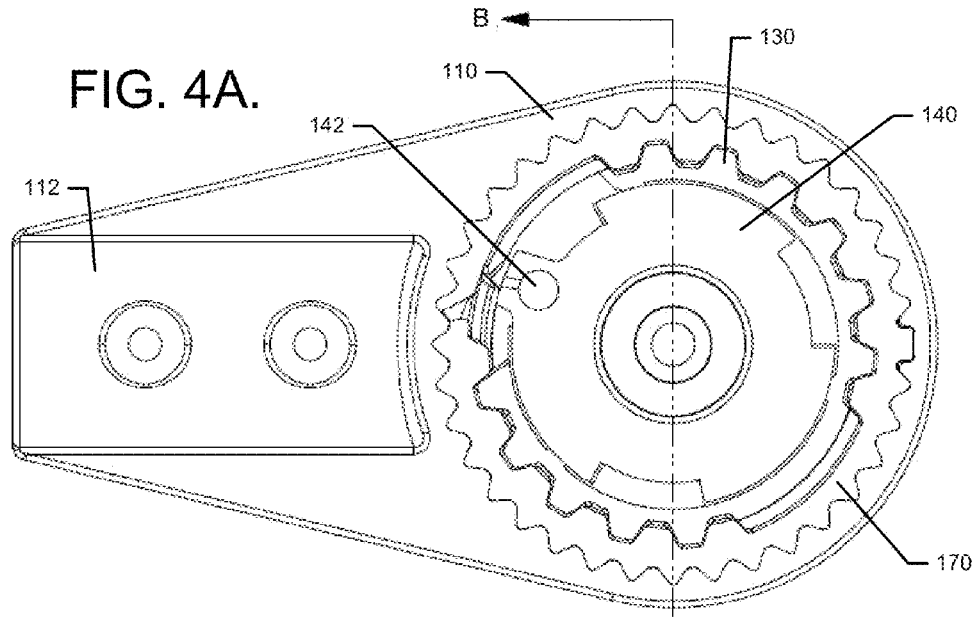
Figure 4B:
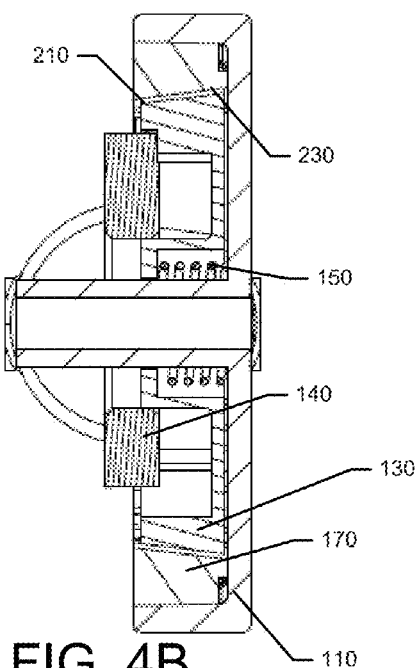
Figure 4C:
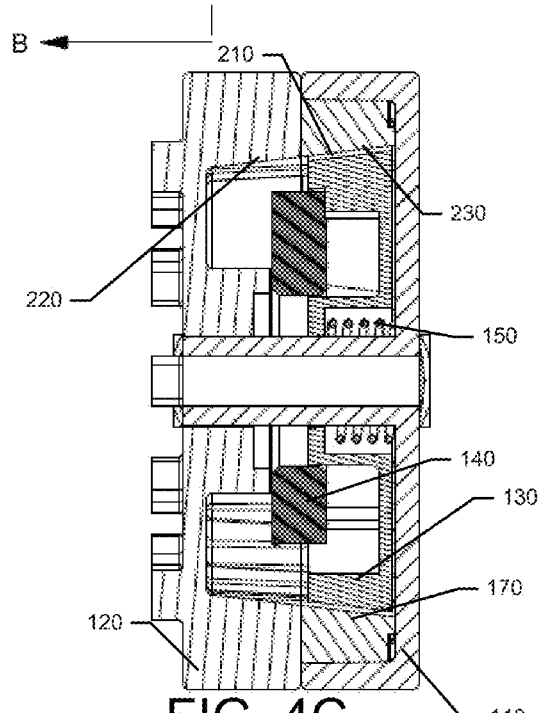
Figure 5A:
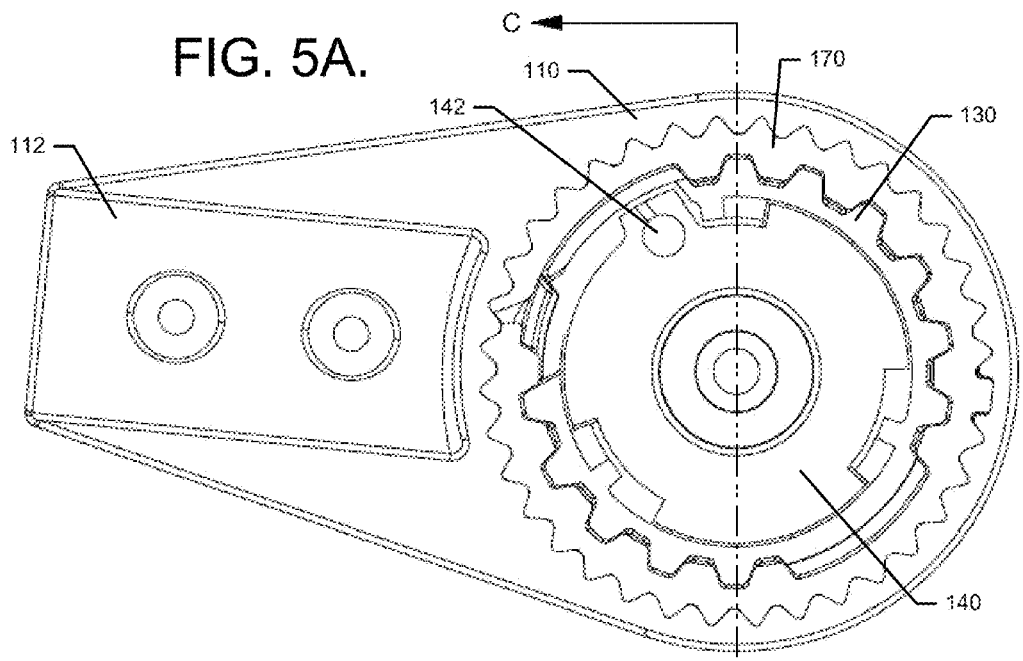
Figure 5B:
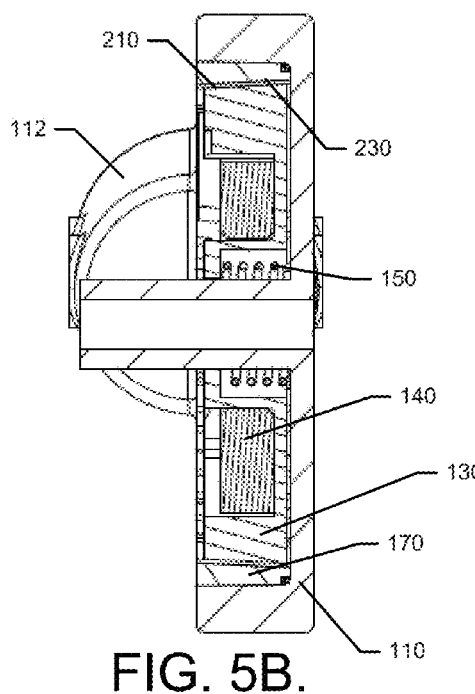
Figure 5C:
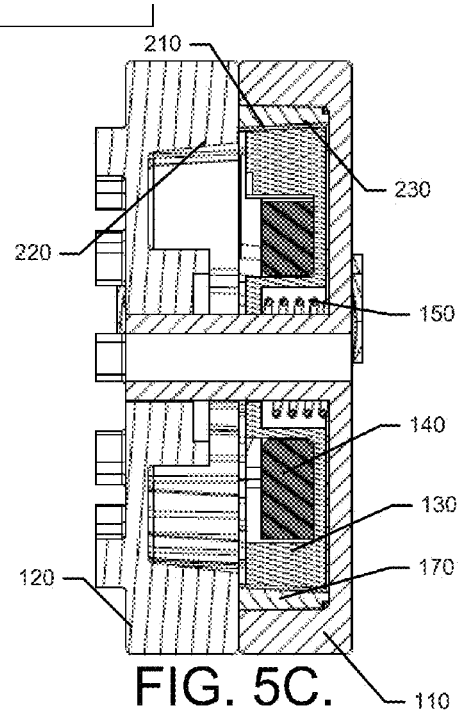
Figure 6A:
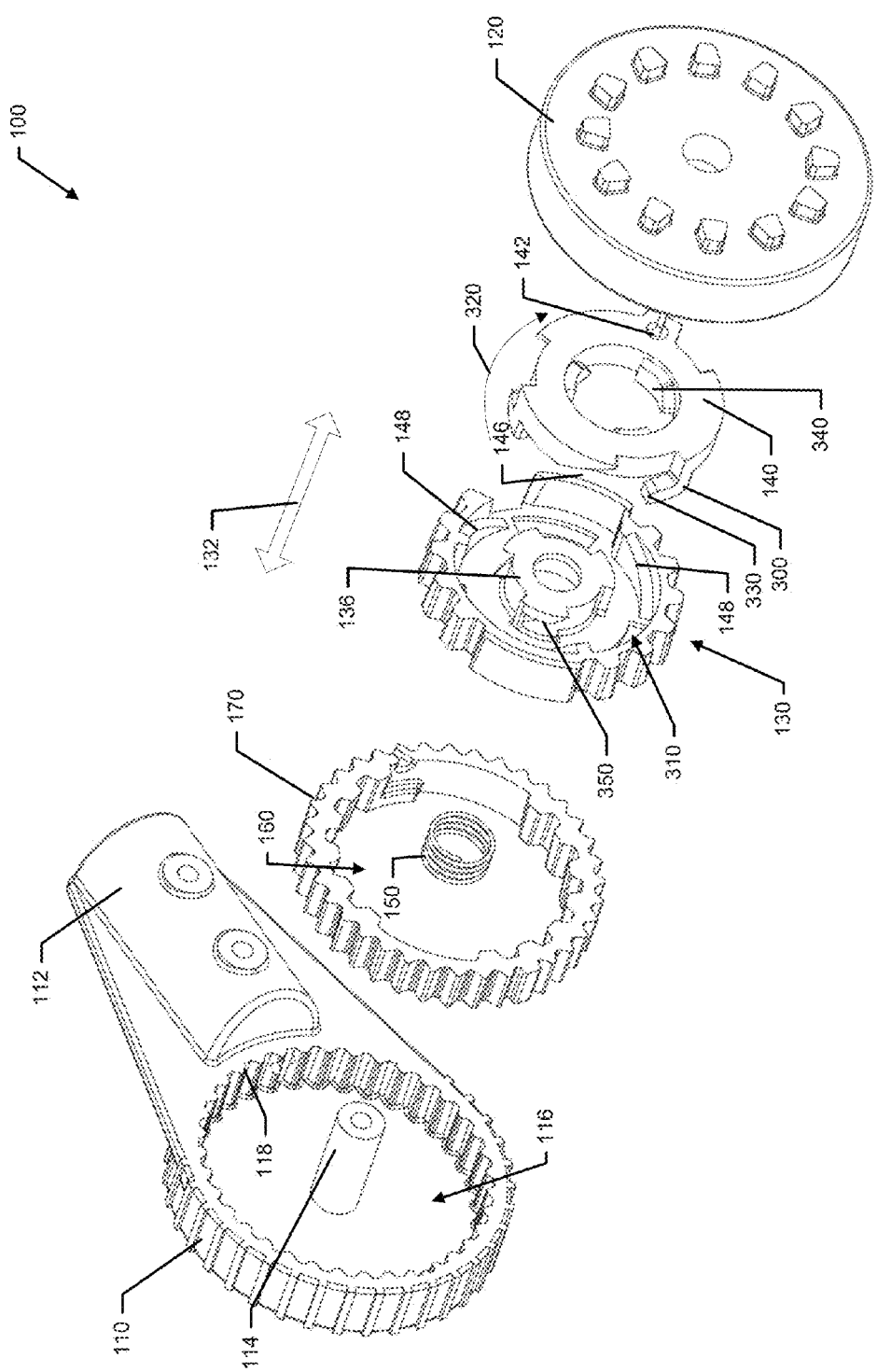
Figure 6B:
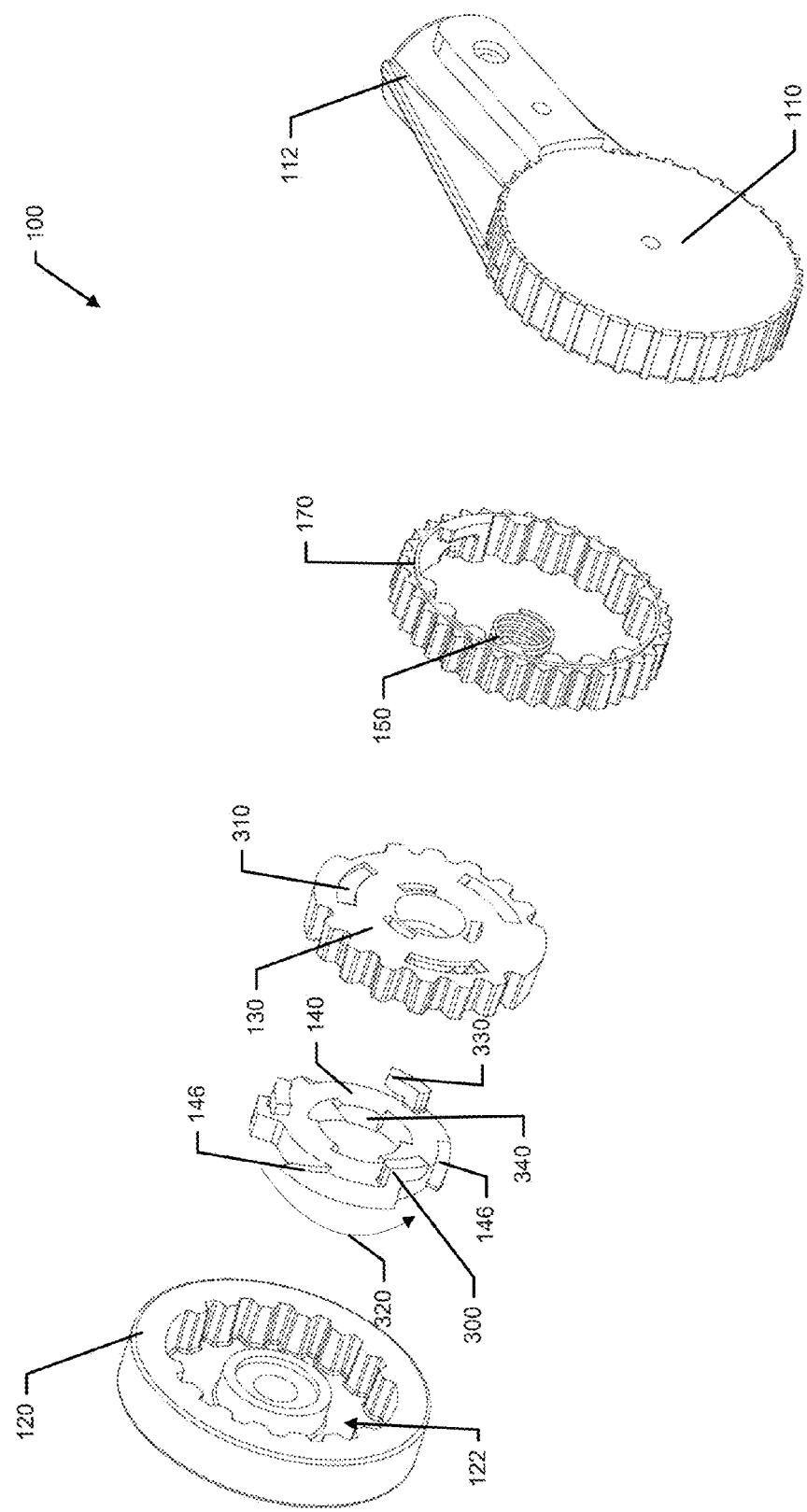
Figure 9:
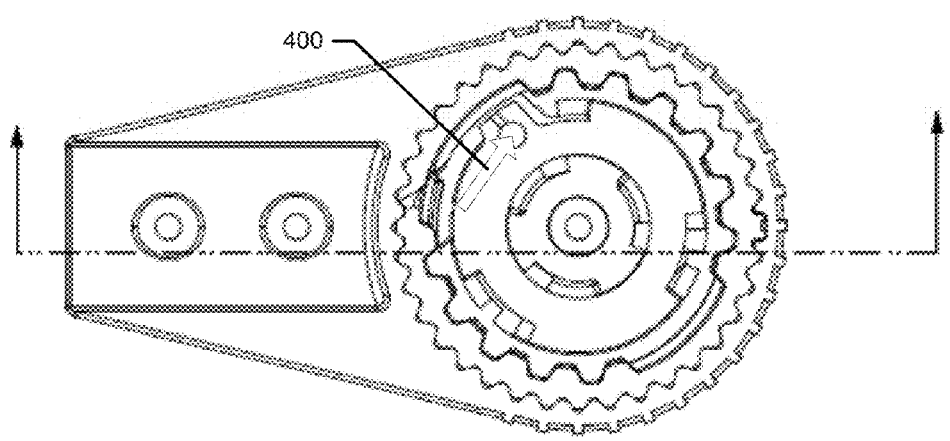

Having thus described the invention in general terms, reference will now be made to the accompanying drawings, which are not necessarily drawn to scale, and wherein:

FIG. 1 illustrates a side view of a stroller employing hinges in accordance with an example embodiment;

FIG. 2, which includes FIGS. 2A and 2B, illustrates an exploded, perspective view of a hinge in accordance with an example embodiment;

FIG. 3, which includes FIGS. 3A, 3B and 3C, shows various components of the hinge in the locked state in accordance with an example embodiment;

FIG. 4, which includes FIGS. 4A, 4B and 4C, shows various components of the hinge in transition out of the locked state in accordance with an example embodiment;

FIG. 5, which includes FIGS. 5A, 5B and 5C, shows various components of the hinge in the unlocked state in accordance with an example embodiment;

FIG. 6, which includes FIGS. 6A and 6B, illustrates opposing perspective views of a hinge that further employs a restraining assembly in accordance with an example embodiment;

FIG. 7, which includes FIGS. 7A, 7B and 7C, shows various components of the hinge in the locked state with a restraining assembly in accordance with an example embodiment;

FIG. 8, which includes FIGS. 8A, 8B and 8C, shows various components of the hinge in the unlocked state with a restraining assembly in accordance with an example embodiment; and FIG. 9 illustrates a top view of portions of the hinge in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should also be appreciated that although the term "zero play" may be referenced herein, example embodiments are not intended to be defined on the basis of any particular gap size or other characteristics that may achievable using the designs described herein in reference to a particular amount of play such design achieves. Instead, example embodiments are directed to the structures defined herein and the term "zero play" is merely a moniker that may be associated with some example embodiments.

A stroller 10 of an example embodiment is shown in FIG. 1. The stroller 10 of FIG. 1 happens to be a model having three wheels. However, it should be appreciated that other structures for the stroller 10 may alternatively be employed including, for example, four wheeled models. The arrangement and positions of various frame members, wheels, seat(s), handles, accessories and other structures may be altered in accordance with many such designs. Thus, the stroller 10 of FIG. 1 should be appreciated as merely being one non-limiting example of a structure that may employ an example embodiment.

FIG. 1 illustrates a side view of the stroller 10, which may employ one or more hinges in accordance with an example embodiment. In this regard, as shown in FIG. 1, the stroller 10 may include at least a front wheel 20 and rear wheels 22 that may be supported by a frame 30. The frame 30 may be constructed of a plurality of substantially rigid frame members that may be positioned to define a receiving space therebetween. A seat 40 may be supported by the frame 30 within the receiving space to enable a child to sit therein to be transported by the stroller 10. Thus, it should be appreciated that some of the frame members shown in FIG. 1 may be duplicated on the opposite side of the seat 40 relative to the frame members that are visible in FIG. 1.

The frame 30 may include a rear strut 32 that may extend from an interior portion of the frame 30 (relative to the longitudinal ends of the frame 30) rearward toward the rear wheel 22. A front member 34 may extend from a point at which the rear strut 32 intersects the rest of the frame 30 (or a location relatively close to the point of such intersection) forward to the front wheel 20. A top member 36 may extend substantially upward and/or rearward toward a handle 38 of the stroller 10. The top member 36 may extend from the point of the intersection of the rear strut 32 with the rest of the frame 30 in some cases. However, in some cases, an extension portion 37 may be provided between the top member 36 and the point of the intersection of the rear strut 32 with the rest of the frame 30. As mentioned above, the front member 34, rear strut 32, top member 36 and extension portion 37 (if included) may be duplicated on the left side of the frame as well, since FIG. 1 only shows the right side.

In an example embodiment, one or more (or all) of the segments of the frame 30 may be operably coupled to each other or to other structural members via a hinge of an example embodiment. In this regard, FIG. 1 illustrates several examples of hinges that could be employed in connection with various example embodiments. As shown in FIG. 1, the handle 38 may be operably coupled to the top member 36 via a first hinge 52. Meanwhile, the rear strut 32 may be operably coupled to the front member 34 (and/or the extension portion 37) via a second hinge 54. If the extension portion 37 is included, the extension portion 27 may be operably coupled to the top member 36 via a third hinge 56.

As one of skill in the art will appreciate, each of the hinges may be duplicated on the left side of the stroller 10 as well to create a hinge assembly about which corresponding portions of the stroller 10 can be folded. As such, operation of the first hinge 52 (and its hinge pair on the opposite side) may enable the handle 38 to be folded (e.g., pivoted, swiveled, rotated or articulated) about an axis defined by the first hinge 52. Thus, the handle 38 may be moved as shown by arrow 60. Operation of the third hinge 56 may enable the top member 36 to be folded toward the front member 30 about an axis defined by the third hinge 56. Thus, the top member 36 and handle 38 may be folded forward in the direction shown by arrow 62. The rear strut 38 may also be folded about an axis defined by the second hinge 54 so that the rear strut 32 can move closer to the forward member 34 (or vice versa) as shown by arrow 64.

In the example described above, the extension portion 37 may actually be an extension of the front member 34. Thus, the only pivot enabled by the second hinge 54 may be pivoting of the rear wheel 22 forward as the rear strut 32 is rotated toward the forward member 34. This would be consistent with example embodiments in which the hinges (52, 54 and 56) are provided to operably couple one member that is substantially fixed and another member that is substantially movable when the hinges are in an unlocked state. The movable member can then be rotated about the hinge toward the fixed member. However, it should be appreciated that example embodiments could also be practiced in the context of hinges involving two movable members and a fixed member. Thus, for example, in embodiments in which the third hinge 56 is excluded and the extension portion 37 is omitted (or is a part of the top member 36), the rear strut 32 could be a fixed member and the top member 36 and front member 34 could each be movable members configured to fold or collapse toward the rear strut 32 when the second hinge 54 is in the unlocked state.

The first, second and third hinges 52, 54 and 56 may each be operable either by local or remote actuation. In the context of local operation, a button or other such operator at the hinge itself may be pressed to shift the corresponding hinge from the locked state to the unlocked state. For remote operation, some example embodiments may employ an operator 70 that may be operably coupled to a cable that may run inside one or more of the frame members to activate an actuator of the hinges. As such, for example, the operator 70 may be operably coupled to any one of the hinges. Multiple operators may be provided for respective different hinges in some cases.

FIG. 2 shows perspective views of a hinge 100 in accordance with an example embodiment. The hinge 100 may be an example structure that may be employed to embody any or all of the first hinge 52, the second hinge 54 and the third hinge 56 of FIG. 1. As shown in FIG. 2, the hinge 100 may include a first housing portion 110 and a second housing portion 120 that may combine to substantially enclose the components that form the hinge 100. As such, the first and second housing portions 110 and 120 may meet each other to define a plane (e.g., a locking plane) and a locking member may be used to move relative to the locking plane to shift the hinge 100 between locked and unlocked states, as described below.

In some cases, the first housing portion 110 may be referred to as a moving hinge portion and the second housing portion 120 may be referred to as a fixed hinge portion to describe the relative motion of the two housing portions when folding occurs while the hinge 100 is in an unlocked state. However, it should be appreciated that when the hinge 100 is in the fixed state, both the first and second housing portions 110 and 120 are essentially fixed. Moreover, even when in the unlocked state, it is possible that either of the first and second housing portions 110 and 120 could be considered to be "moving" dependent upon the frame of reference of the observer. Accordingly, the terms "moving" and "fixed" in this context should be understood to merely convey which hinge part is associated with a corresponding frame member that folds or collapses (i.e., the moving member) toward another frame member (i.e., the fixed member) when the stroller is collapsed or folded about the hinge 100.

Referring again to FIG. 2, the first and second housing portions 110 and 120 may each include a corresponding sleeve to which a respective frame member may be affixed. In FIG. 2, only a sleeve 112 of the first housing portion 110 is shown. However, it should be appreciated that another sleeve may be provided on the second housing portion 120 extending radially outward from a periphery of the second housing portion 120. The first housing portion 110 may include an arbor 114 defining an axis of rotation for the hinge 100. Accordingly, when the hinge 100 is in the unlocked state, the orientation of the frame members in the corresponding sleeves of the first and second housing portions 110 and 120 relative to each other may be adjusted by rotation about the arbor 114 (i.e., about the axis of the hinge 100). However, when the hinge 100 is in the locked state, the orientation of the frame members in the corresponding sleeves of the first and second housing portions 110 and 120 relative to each other may be fixed. Moreover, by employing an example embodiment (e.g., a "zero play hinge"), the fixation of the first and second housing portions 110 and 120 may be relatively rigid, with little or no play, and without generating any visible gaps or pinch points in the hinge 100.

To accomplish the transition between the locked state, in which the first and second housing portions 110 and 120 are fixed in their orientations relative to each other, and the unlocked state, in which the first and second housing portions 110 and 120 are allowed to move relative to each other, the hinge 100 employs a locking member 130 and a release actuator 140. As will be discussed in greater detail below, the locking member 130 is configured to move along the axial direction (i.e., in the directions shown by double arrow 132) to shift between a locked state position and an unlocked state position, which positions correlate to the locked state and unlocked state, respectively, of the hinge 100. Meanwhile, the release actuator 140 is operated to force the locking member 130 out of the locked state position and into the unlocked state position. In some cases, a biasing member (e.g., spring 150) may be provided to bias the locking member 130 toward the locked state position. In some embodiments, the locking member 130 may be disposed substantially on one side of the locking plane (i.e., engaging only the first housing portion 110) when the hinge 100 is in the unlocked state (against the biasing force of the spring 150) and the locking member 130 may penetrate substantially through the locking plane to engage the first and second housing portions 110 and 120 simultaneously when the hinge 100 is in the locked state.

In an example embodiment, the locking member 130 may have a general shape that is frustoconical. As such, the locking member 130 may have a substantially conical shape between two planes except that various surface features may be provided to the side walls of the conical shape (e.g., teeth and apertures in registration with each other). A first plane may form a substantially plate shaped base of the frustoconical shape of the locking member 130. A second plane may form a top of the frustoconical shape of the locking member 130. However, the top of the locking member 130 may define an actuator receiving space 134 into which the release actuator 140 may be disposed. The locking member 130 may also define a hub 136 configured to slidably engage the arbor 114. In some cases, the hub 136 may also house the spring 150 so that the spring 150 exerts a force pushing the locking member 130 away from the first housing portion 110 along the axis defined by the arbor 114. Although the release actuator 140 may rotate about the hub 136 when the release actuator 140 is operated or actuated, the hub 136 generally only moves in the axial direction (i.e., in the direction shown by arrow 132) and does not rotate about the arbor 114.

In some embodiments, an interior portion of the first housing portion 110 may define a locking member receiving aperture 160 into which the locking member 130 may be disposed. The locking member receiving aperture 160 may also be substantially frustoconical in shape with its base formed at a surface 111 of the first housing portion 110 that lies perpendicular to the axis of rotation of the hinge 100 (and therefore also perpendicular to the direction of extension of the arbor 114). A top of the frustoconical shape of the locking member receiving aperture 160 (which should be understood to be substantially open to allow the locking member 130 to move therethrough) may correspond to the locking plane. Sides of the frustoconical shape forming the locking member receiving aperture 160 may correspond to sides of a periphery of a hollowed annulus formed concentric with the arbor 114 in the first housing portion 110. However, in some embodiments, since it may be difficult to mold or otherwise form the first housing portion 110 to have the locking member receiving aperture 160 with the substantially frustoconical shape, the first housing portion 110 may be formed in two pieces. In this regard, a locking insert 170 may be provided with the first housing portion 110 such that the locking insert 170 can be easily molded or otherwise formed to include the substantially frustoconically shaped locking member receiving aperture 160, while fitting securely with the first housing portion 110.

To fit the locking insert 170 securely with the first housing portion 110, the first housing portion 110 may be provided with a receiving space 116 defined between a plurality of engagement ribs 118 and the arbor 114. The engagement ribs 118 may form a series of inwardly projecting teeth, ridges or other such features that are disposed about the periphery of the receiving space 116. As such, the engagement ribs 118 may be formed to extend inwardly in a radial direction toward the arbor 114 with an exposed surface that extends substantially parallel to the axis defined by the arbor 114. The exposed surfaces of the engagement ribs 118 may, when viewed from a point on the axis that is spaced apart from the hinge 100, have a triangular shape, a sinusoidal shape, a rectangular shape, or any other suitable shape that is conducive to making a connection to an annulus shaped member with corresponding shapes formed on its outer periphery. Moreover, in some examples, one of the valleys between the engagement ribs 118 (e.g., a keying valley 119) may be formed with a different shape than the other valleys between engagement ribs 118 to provide a reference point for engagement between the locking insert 170 and the first housing portion 110. In this regard, the engagement ribs 118 may serve as peaks that are separated from each other by adjacent valleys formed between the peaks. Meanwhile, protrusions 172 may be formed on the external periphery of an annular component that is sized to fit in the receiving space 116 (i.e., on the locking insert 170) and the protrusions 172 may extend into the valleys formed between the engagement ribs 118. Meanwhile, spaces between such protrusions 172 may receive the engagement ribs 118. The protrusions 172 may also extend substantially parallel to the axis between the surface 111 of the first housing portion 110 and the locking plane.

The correspondence between engagement ribs 118 and protrusions 172 may form a relatively tight fit between the first housing portion 110 and the locking insert 170. Thus, when the locking insert 170 is inserted into the receiving space 116, the locking insert 170 may be relatively fixed therein. A keying protrusion 174 may be provided to have a different shape than other protrusions 172 (i.e., a shape matching the shape of the keying valley 119) to ensure that the alignment between the locking insert 170 and the first housing portion 110 is properly set.

In an example embodiment, the frustoconical shape of the locking member 130 provides that a diameter of the locking member 130 at its base (i.e., $d_b$) is larger than a diameter of the locking member 130 at its top (i.e., top diameter $d_t$). Similarly, the locking member receiving aperture 160 is shaped such that the diameter of its base (i.e., base diameter $D_B$) is larger than the diameter at its top ($D_T$). In an example embodiment, the top diameter top diameter $d_t$ may be smaller than top diameter $D_T$, but the base diameter $d_b$ may be greater than the top diameter $D_T$. Meanwhile, the base diameter $d_b$ is also smaller than base diameter $D_B$. This arrangement allows the locking member 130 to move through the locking plane. However, at some point while the locking member 130 is moving through the locking plane away from the first housing portion 110, the locking member 130 will become to wide to move completely out of the locking member receiving aperture 160 and would be wedged therein as an outer or side surface of the locking member 130 engages an inner surface of the locking insert 170 that bounds and forms the locking member receiving aperture 160.

To ensure proper alignment of the locking member 130 relative to the locking insert 170, an outer periphery of the locking member 130 may be provided with teeth, ridges, ribs, and/or the like (e.g., engagement teeth 138). Meanwhile, corresponding teeth, ridges, ribs and/or the like (e.g., engagement teeth 176) may also be formed on an inner periphery of the locking insert 170. In this regard, the teeth may be positioned to form apertures adjacent thereto, and each tooth of one component may be configured to extend into a corresponding aperture of the other. In some cases, one or more key teeth (e.g., key tooth 139) may be formed to extend into a corresponding key aperture (e.g., aperture 178) to again ensure that the locking member 130 is assembled in the locking insert 170 with the proper orientation. Width of the engagement teeth 138 may decrease while proceeding in the direction from the base to the top of the locking member 130. Meanwhile, width of the apertures 178 that correspond to these teeth 138 may also correspondingly decrease while proceeding in the direction away from the surface 111 of the first housing portion 110.

Of note, the diameters mentioned above could be measured either from the outer (or inner) surfaces of the teeth or from the outer (or inner) surfaces of the apertures. Moreover, either or both of the outer (or inner) surfaces of the teeth or the outer (or inner) surfaces of the apertures, if made continuous (e.g., by removal of any tooth or aperture between each adjacent aperture or tooth), the resultant shape could be frustoconical. As such, sides of the teeth and/or apertures may be inclined toward the axis as one proceeds in the direction from the first housing portion 110 to the second housing portion 120. This direction could be reversed, however. In such a case, the inclining of surfaces would be toward the axis as one proceeds in the direction from the second housing portion 120 to the first housing portion 110.

As can be appreciated from the description above, and from FIGS. 3-5, when the locking member 130 is substantially provided within the locking member receiving aperture 160 (i.e., substantially not protruding through the locking plane), the teeth and apertures of the locking member 130 and the locking insert 170 may generally remain aligned, but the inclined surfaces of the sides thereof may not be in contact with each other (see FIG. 3). Accordingly, the locking member 130 may be allowed to move axially along the arbor 114 away from the first housing portion 110. Furthermore, the spring 150 may bias the locking member 130 accordingly.

Meanwhile, the second housing portion 120 may also define a receiving aperture 122 into which the locking member 130 may be inserted when the locking member 130 passes through the locking plane away from the first housing portion 110. The receiving aperture 122 may also be substantially frustoconical in shape and may include teeth 124 and apertures 126 that may align directly with corresponding teeth 176 and apertures of the locking insert 170. The teeth 124 and apertures 126 may be configured to receive corresponding apertures and teeth 138, respectively, of the locking member 130. The draft or incline of the side surfaces that form the receiving aperture 122 and the locking member receiving aperture 160 may be substantially the same to form a relatively continuous frustoconical shaped gap including both the receiving aperture 122 and the locking member receiving aperture 160. This combined gap allows the locking member 130 to remain properly aligned while moving axially along the arbor 114 responsive to urging by the spring 150 or by the release actuator 140. Moreover, since the incline or draft is continuous, when the locking member 130 moves through the locking plane to a point at which the external periphery of the locking member 130 becomes bound in contact with the inner periphery of the locking insert 170, the locking member 130 also becomes bound in contact with the inner periphery of the second housing portion 120. The teeth and apertures of the locking insert 170, the locking member 130 and the second housing portion 120 then become bound relatively tightly together to fix the hinge 100 in the locked state. As such, when the second housing portion 120 is rotated to an orientation in which the inclined surfaces inner periphery of the locking insert 170 and second housing portion 120 are aligned with each other to form a substantially continuous surface crossing the locking plane, the locking member 130 is enabled to simultaneously engage the aligned inclined surfaces with the corresponding inclined surfaces on the outer periphery of the locking member 130.

As mentioned above, the spring 150 biases the locking member 130 away from the first housing portion 110 and toward the second housing portion 120. To overcome the biasing of the spring 150 (i.e., the spring force), the release actuator 140 must be operated. In an example embodiment, a cable receiver 142 may be provided in the release actuator 140 to allow a rotational force to be exerted on the release actuator 140 (e.g., via operation of operator 70) to cause the release actuator 140 to rotate within the actuator receiving space 134 in the direction shown by arrow 144. Ramp surfaces 146 provided at a portion of the release actuator 140 that faces the locking member 130 may be configured to engage corresponding ramps 148 provided in the actuator receiving space 134. When the rotational force in the direction of arrow 144 is provided, the rotation of the release actuator 140 and interface between the ramp surfaces 146 and the ramps 148 may force the locking member 130 away from the second housing portion 120 and toward the first housing portion 110. When the locking member 130 is moved toward the first housing portion 110 far enough to place the locking member 130 substantially on one side of the locking plane (e.g., no longer protruding through the locking plane), then the teeth and apertures of the locking member 130 may no longer engage the corresponding apertures and teeth of the second housing portion 120, and the second housing portion 120 may be free to rotate relative to the first housing portion 110 as the hinge 100 may be in the unlocked state.

It should be noted that although the ramp surfaces 146 are shown proximate to an outer periphery of the release actuator 146 to correspond to the ramps 148, which are provided spaced apart from each other at corresponding locations near the periphery of the actuator receiving space 134, these corresponding surfaces could alternatively be placed at other locations as long as they remain in registration with each other.

FIG. 3, which includes FIGS. 3A, 3B and 3C, shows various components of the hinge 100 in the locked state. FIG. 3A illustrates a top view of the hinge 100 with the second housing portion 120 removed. FIG. 3B illustrates a cross section view of the hinge 100 taken along line A-A in FIG. 3A with the second housing portion 120 removed. FIG. 3C illustrates a cross section view of the hinge 100 taken along line A-A in FIG. 3A with the second housing portion 120 attached.

As shown in FIG. 3, the release actuator 140 is in a rest state (i.e., without force to overcome the spring 150 applied), so the spring 150 urges the locking member 130 in the direction of arrow 200. Incline surface 210 of the locking member 130 is moved until it engages both incline surface 220 of the second housing portion 120 and incline surface 230 of the locking insert 170. The locking member 130 is passed through the locking plane (indicated by dashed line 240) to prevent rotation of the second housing portion 120 relative to the first housing portion 110. Moreover, the engagement of the incline surfaces makes for a tight fit with relatively little play, to create a rigid joint when the hinge 100 is in the locked position.

FIG. 4, which includes FIGS. 4A, 4B and 4C, shows various components of the hinge 100 in transition out of the locked state. FIG. 4A illustrates a top view of the hinge 100 with the second housing portion 120 removed. FIG. 4B illustrates a cross section view of the hinge 100 taken along line B-B in FIG. 4A with the second housing portion 120 removed. FIG. 4C illustrates a cross section view of the hinge 100 taken along line B-B in FIG. 4A with the second housing portion 120 attached.

As shown in FIG. 4, the release actuator 140 is forced in the direction of arrow 250, which causes the ramp surfaces 146 of the release actuator 140 to engage the ramps 148 of the locking member 130 forcing the locking member 130 to move in the direction of arrow 260 against the biasing force of the spring 150 (thereby compressing the spring 150). The incline surface 210 of the locking member 130 is disengaged from both incline surface 220 of the second housing portion 120 and incline surface 230 of the locking insert 170. The locking member 130 is moved entirely to one side of the locking plane (and no longer passes therethrough) to enable rotation of the second housing portion 120 relative to the first housing portion 110. Thus, the first housing portion 110 can be moved relative to the second housing portion 120 as shown in FIG. 5.

FIG. 5, which includes FIGS. 5A, 5B and 5C, shows various components of the hinge 100 in the unlocked state. FIG. 5A illustrates a top view of the hinge 100 with the second housing portion 120 removed. FIG. 5B illustrates a cross section view of the hinge 100 taken along line C-C in FIG. 5A with the second housing portion 120 removed. FIG. 5C illustrates a cross section view of the hinge 100 taken along line C-C in FIG. 5A with the second housing portion 120 attached.

As shown in FIG. 5, the locking member 130 is moved entirely to one side of the locking plane (and does not pass therethrough) to enable rotation of the second housing portion 120 relative to the first housing portion 110. The sleeve 112 can be seen to be slightly rotated. Furthermore, the incline surface 210 of the locking member 130 is unable to move through the locking plane because the incline surface 220 of the second housing portion 120 and incline surface 230 of the locking insert 170 are not in alignment due to the teeth and apertures of the second housing portion 120 and the locking insert 170 being out of alignment due to rotation of the first housing portion 110. When the teeth and apertures of the second housing portion 120 and the locking insert 170 are rotated to a point where they are in alignment, the locking member 130 may be enabled to return back to positions shown in FIG. 3 since the spring 150 may return the locking member 130 to the locked state.

In the examples of FIGS. 3-5, the locking member 130 may generally be held in the locked state by the spring 150, and may be enabled to transition to the unlocked state by movement of the release actuator 140 as described above. However, in some cases it may be further desirable to allow the locking member 130 to be locked or restrained within the locked state. Accordingly, a restraining assembly may be provided to lock or restrain the locked member in the locked state. FIGS. 6-8 illustrate examples that employ such a restraining assembly. The examples of FIGS. 6-8 may have substantially similar components except where noted below.

FIG. 6, which includes FIGS. 6A and 6B, illustrates opposing perspective views of a hinge 100 that further employs a restraining assembly in accordance with an example embodiment. As shown in FIG. 6, the first and second housing portions 110 and 120, and the locking insert 170 may be substantially the same as described above. However, the locking member 130 and the release actuator 140 may be provided with additional features to embody the restraining assembly. For example, the release actuator 140 may include restraining protrusions 300 that extend into restraining apertures 310 within the base of the locking member 130. The restraining protrusions 300 may be configured to slide within a corresponding one of the restraining apertures 310 when the locking member 130 is in or transitioning to the unlocked state. However, when the locking member 130 is in the locked state, the release aperture may be turned in the direction of arrow 320 and a head portion 330 of the restraining protrusion 300 may engage the base of the locking member 130 proximate to the restraining aperture 310 to hold or retain the locking member 130 in the locked state.

At the same time, orientation ramps 340 may be positioned on an interior surface of the release actuator 140 rotates about the hub 136 of the locking member 130. The orientation ramps 340 may be configured to engage orientation guide slots 350 provided at the hub 136. The orientation ramps 340 and orientation guide slots 350 may provide alignment of the restraining assembly components described above. In this regard, the orientation ramps 340 and orientation guide slots 350 may be configured to provide axial alignment for the release actuator 140 during rotation of the release actuator 140 for locking and unlocking of the locking member 130. The orientation ramps 340 and orientation guide slots 350 also work together to define limitations on the axial position of the release actuator 140 during rotation of the release actuator 140.

FIG. 7, which includes FIGS. 7A, 7B and 7C, shows various components of the hinge 100 in the locked state. FIG. 7A illustrates a top view of the hinge 100 with the second housing portion 120 removed. FIG. 7B illustrates a cross section view of the hinge 100 taken along line D-D in FIG. 7A with the second housing portion 120 removed. FIG. 7C illustrates a cross section view of the hinge 100 taken along line D-D in FIG. 7A with the second housing portion 120 attached.

As shown in FIG. 7, the release actuator 140 is in a rest state (i.e., without force to overcome the spring 150 applied), so the spring 150 urges the locking member 130 in the direction of arrow 200. Incline surface 210 of the locking member 130 is moved until it engages both incline surface 220 of the second housing portion 120 and incline surface 230 of the locking insert 170. The locking member 130 is passed through the locking plane (indicated by dashed line 240) to prevent rotation of the second housing portion 120 relative to the first housing portion 110. The head portion 330 of the restraining protrusion 300 is also passed between the base 331 of the locking member 130 and the surface 111 of the first housing portion 110 to prevent the spring force from being overcome, or at least prevent the locking member 130 from being moved in a direction opposite of the direction of arrow 200 until the release actuator 140 is rotated to a point at which the head portion 330 of the restraining protrusion 330 is not positioned between the base 331 and the surface 111. Accordingly, the hinge 100 is restrained in the locked state.

FIG. 8, which includes FIGS. 8A, 8B and 8C, shows various components of the hinge 100 in the unlocked state. FIG. 8A illustrates a top view of the hinge 100 with the second housing portion 120 removed. FIG. 8B illustrates a cross section view of the hinge 100 taken along line E-E in FIG. 8A with the second housing portion 120 removed. FIG. 8C illustrates a cross section view of the hinge 100 taken along line E-E in FIG. 8A with the second housing portion 120 attached.

As shown in FIG. 8, the locking member 130 is moved entirely to one side of the locking plane (and does not pass therethrough) to enable rotation of the second housing portion 120 relative to the first housing portion 110. The sleeve 112 can be seen to be slightly rotated. Furthermore, the incline surface 210 of the locking member 130 is unable to move through the locking plane because the incline surface 220 of the second housing portion 120 and incline surface 230 of the locking insert 170 are not in alignment due to the teeth and apertures of the second housing portion 120 and the locking insert 170 being out of alignment due to rotation of the first housing portion 110. When the teeth and apertures of the second housing portion 120 and the locking insert 170 are rotated to a point where they are in alignment, the locking member 130 may be enabled to return back to positions shown in FIG. 3 since the spring 150 may return the locking member 130 to the locked state. Of note, the restraining protrusion 300 can be seen to no longer be disposed between the base 331 of the locking member 130 and the surface 111 of the first housing portion 110. Instead, since the release actuator 140 has been rotated (as described above), the restraining protrusion 300 is rotated within the restraining aperture 310 to allow the head portion 330 to be passed through the restraining aperture 310 when the locking member 130 moves in the direction of arrow 205 to shift the hinge 100 to the unlocked state.

It should also be appreciated that the restraining assembly could be embodied in other ways. For example, the function and/or structure of the head portion 330, which is configured to be wedged between the base 331 and the surface 111 to prevent axial motion of the locking member 130, could be provided in other ways. In some cases, a head portion or restraining protrusion could move between the base 331 and the surface 111 through a portion of the first housing portion 110 (e.g., through a sidewall or base of the first housing portion 110). Furthermore, in some cases, a head portion or restraining protrusion could between the base or another portion of the locking member 130 and a base of the second housing portion 120. In any case, the head portion or restraining protrusion would be inserted as a wedge to prevent axial movement of the locking member 130 out of the locked state.

In some cases, a spring may be provided to urge the release actuator 140 in the direction shown by arrow 400 in FIG. 9. This spring may create a rotational force in the direction of arrow 400 to facilitate holding and/or retaining the restraining assembly in the locked position. In some cases, the spring 150 described above may be removed when the restraining assembly of FIGS. 6-9 is employed. In particular, when a radial spring such as the spring described above (which imparts the force in the direction of arrow 400) is employed, an axial spring (e.g., spring 150) may not be necessary. It should also be appreciated that although the hinge 100 described above has been shown to work with two frame members, the hinge 100 could be adapted to also work in relation to three frame members (or more) by compounding the hinge components axially. When constructed to facilitate folding of three members, the second housing portion 120 could be essentially duplicated in a back-to-back arrangement so that the frame member attached to the second housing portion 120 is essentially fixed. Meanwhile, a corresponding first housing portion 110 could be oriented in opposing directions to interface with each opposing side of the duplicated second housing portions 120. The frame members of the corresponding first housing portions 110 could then each pivot (e.g., in opposite directions) relative to the fixed frame member.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A stroller comprising:
   a seat for supporting a passenger;
   a frame configured to support the seat, the frame comprising at least a first frame member and a second frame member; and
   a hinge configured to pivotally engage the first and second frame members to each other,
   wherein the hinge comprises:
      a first housing portion operably coupled to the first frame member,
      a second housing portion operably coupled to the second frame member,
      a release actuator configured to operate to enable the hinge to shift between a locked state and an unlocked state, and
      a locking member configured to move in an axial direction responsive to shifting between the locked state and the unlocked state,
      wherein the locking member is formed in a substantially frustoconical shape, and
      wherein an external periphery of the locking member comprises a first incline surface that engages both the first housing portion and the second housing portion in the locked state.

2. The stroller of claim 1, wherein the first housing portion defines a substantially frustoconically shaped receiving space to receive the locking member, an internal periphery of the receiving space comprising a second incline surface configured to engage the first incline surface when the locking member is in the locked state.

3. The stroller of claim 2, wherein the first housing portion includes a locking insert forming an annulus, an outer periphery of the annulus being fixedly engaged with the first housing portion, and an inner periphery of the annulus forming the receiving space.

4. The stroller of claim 2, wherein the first housing portion and the locking member each include corresponding teeth and apertures configured to be in registration with each other, the first and second incline surfaces being formed on the corresponding teeth and apertures.

5. The stroller of claim 4, wherein the hinge further comprises a spring provided coaxially with the locking member to bias the locking member into the locked state, and wherein the sliding engagement of the ramp surfaces and ramps overcomes a force of the spring to transition the locking member into the unlocked state.

6. The stroller of claim 1, wherein the release actuator comprises a plurality of ramp surfaces configured to engage corresponding ramps of the locking member, the ramp surfaces and ramps providing sliding engagement of the release actuator to transition the locking member into the unlocked state.

7. The stroller of claim 6, wherein the sliding engagement of the ramp surfaces and ramps is initiated responsive to manual actuation of an operator coupled to the release actuator via a cable.

8. The stroller of claim 1, wherein the hinge further comprises a restraining assembly configured to hold the locking member in the locked state.

9. The stroller of claim 8, wherein the restraining assembly comprises a head portion configured to be disposed between a base of the locking member and a surface of the first housing portion or the second housing portion to inhibit axial motion of the locking member to retain the locking member in the locked state.

10. The stroller of claim 8, wherein the restraining assembly comprises restraining protrusions disposed at the release actuator and restraining apertures disposed at a base of the locking member, and wherein the restraining protrusions are configured to slide within corresponding ones of the restraining apertures when the locking member is in or transitioning to the unlocked state.

11. The stroller of claim 10, wherein the release actuator comprises orientation ramps positioned on an interior surface of the release actuator to engage orientation guide slots disposed on a hub of the locking member.

12. The stroller of claim 1, wherein the locking member has a first diameter at a base of the locking member and a second diameter at a top of the locking member, the first diameter being larger than the second diameter.

13. The stroller of claim 12, wherein the receiving space comprises a third diameter at a base of the receiving space and a fourth diameter at a top of the receiving space, the third diameter being larger than the fourth diameter, and wherein the fourth diameter is less than the first diameter and greater than the second diameter.

14. The stroller of claim 1, wherein a radial spring is provided to impart a rotational force on the release actuator to bias the release actuator to hold the locking member in the locked state.

15. A hinge for pivotally joining a first frame member and a second frame member of a frame of a stroller, the hinge comprising:
   a first housing portion operably coupled to the first frame member,
   a second housing portion operably coupled to the second frame member,
   a release actuator configured to operate to enable the hinge to shift between a locked state and an unlocked state, and
   a locking member configured to move in an axial direction responsive to shifting between the locked state and the unlocked state,
   wherein the locking member is formed in a substantially frustoconical shape, and
   wherein an external periphery of the locking member comprises a first incline surface that engages both the first housing portion and the second housing portion in the locked state.

16. The hinge of claim 15, wherein the first housing portion defines a substantially frustoconically shaped receiving space to receive the locking member, an internal periphery of the receiving space comprising a second incline surface configured to engage the first incline surface when the locking member is in the locked state.

17. The hinge of claim 16, wherein the first housing portion includes a locking insert forming an annulus, an outer periphery of the annulus being fixedly engaged with the first housing portion, and an inner periphery of the annulus forming the receiving space, and wherein the first housing portion and the locking member each include corresponding teeth and apertures configured to be in registration with each other, the first and second incline surfaces being formed on the corresponding teeth and apertures.

18. The hinge of claim 15, wherein the release actuator comprises a plurality of ramp surfaces configured to engage corresponding ramps of the locking member, the ramp surfaces and ramps providing sliding engagement of the release actuator to transition the locking member into the unlocked state.

\* \* \* \* \*